United States Patent
Willis et al.

(10) Patent No.: US 10,109,022 B2
(45) Date of Patent: Oct. 23, 2018

(54) EMAIL AND IDENTITY MIGRATION BASED ON MULTIFACTOR RELATIONSHIP DATA PROVIDED BY USERS AND SYSTEMS

(71) Applicant: QUEST SOFTWARE INC., Aliso Viejo, CA (US)

(72) Inventors: Tomas Charles Willis, Madison, WI (US); Brian Donald Cassel, Verona, WI (US); Adam Mielke, Madison, WI (US)

(73) Assignee: QUEST SOFTWARE INC., Aliso Viejo, CA (US)

(*) Notice: Subject to any disclaimer, the term of this patent is extended or adjusted under 35 U.S.C. 154(b) by 358 days.

(21) Appl. No.: 14/919,930

(22) Filed: Oct. 22, 2015

(65) Prior Publication Data
US 2017/0116205 A1    Apr. 27, 2017

(51) Int. Cl.
*G06F 17/30*    (2006.01)
*G06Q 50/00*    (2012.01)

(52) U.S. Cl.
CPC ....... *G06Q 50/01* (2013.01); *G06F 17/30082* (2013.01)

(58) Field of Classification Search
CPC ........ G06F 17/30079; G06F 17/30082; G06Q 10/06; G06Q 10/107; G06Q 30/02; G06Q 50/01
See application file for complete search history.

(56) References Cited

U.S. PATENT DOCUMENTS

| | | | | |
|---|---|---|---|---|
| 8,095,606 B1* | 1/2012 | Wiley | .................. | G06Q 10/107 709/206 |
| 2004/0128183 A1* | 7/2004 | Challey | .................. | G06Q 30/02 705/7.32 |
| 2008/0228549 A1* | 9/2008 | Harrison | ................ | G06Q 10/06 705/7.14 |

OTHER PUBLICATIONS

Dell, "Migrator for Notes to Exchange" retrieved Oct. 22, 2015 from http://software.dell.com/documents/notes-migrator-for-exchange-datasheet-19865.pdf, 2 pgs.
Wikipedia, "NodeXL" retrieved Oct. 22, 2015 from https://en.wikipedia.org/wiki/NodeXL, 5 pgs.

* cited by examiner

*Primary Examiner* — Etienne Leroux
(74) *Attorney, Agent, or Firm* — Maschoff Brennan (57) ABSTRACT

Methods, systems, and apparatuses for creating collections of associated accounts for a migration process. An example system includes a processing device and memory that stores accounts in accordance with at least one domain. The processing device may create a collection of related accounts stored in accordance with the at least one domain based on active directory information of the stored accounts and information gathered from a survey and may migrate information included in the at least one domain.

17 Claims, 9 Drawing Sheets

EMAIL AND IDENTITY MIGRATION BASED ON MULTIFACTOR RELATIONSHIP DATA PROVIDED BY USERS AND SYSTEMS

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current email, identity and file migration solutions fail to provide a fully robust migration of users to new email, identity and file platforms. These solutions have a difficult time identifying individuals whose data and/or identity should be migrated together. The most common way to solve this problem is by tabulating a master object (for example, mailbox or identity object) list through manual lists and spreadsheets, but it is very difficult to manually manage a spreadsheet that may have many thousands of rows. Plus it is very difficult to collate an accurate and appropriate list of objects for each migration, when the necessary relationship information between mailboxes (or other types of migrating objects) is not included in the spreadsheet or even readily available. Thus, it is difficult to determine which objects should migrate together to minimize the impact on the organization.

SUMMARY

In one example, a system includes a processing device and memory that stores accounts in accordance with a first email domain. The processing device may create a collection of related accounts stored in accordance with a first email or identity domain based on source directory information of the stored accounts and information gathered from one or more surveys and may migrate information for the objects in these automatically generated collections into a second email or identity domain.

The processing device creates the collection by identifying one or more objects/accounts that are identified as having a relationship with other accounts based on a weighted or non-weighted combination of relationship groups that may include delegation attributes, relationship information attained from a survey or other relationship criteria. The processing device may save the identified objects as the collection of related objects, provided that a threshold number of objects has not been reached.

In the delegation example, the attribute may include a right to perform at least one of read, edit, delete, or send-on-behalf on at least one of mail content, contacts content, task content, file content, or calendar content for another account. Alternatively, the relationship attribute leveraged may include information derived from a survey, an organizational chart, group membership information, access control list information, information identifying one account being at least one of a sender to or a recipient from another account based on a threshold number of communications, and/or mentor information.

BRIEF DESCRIPTION OF THE DRAWINGS

A more complete understanding of the present disclosure may be obtained by reference to the following Detailed Description, when taken in conjunction with the accompanying Drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
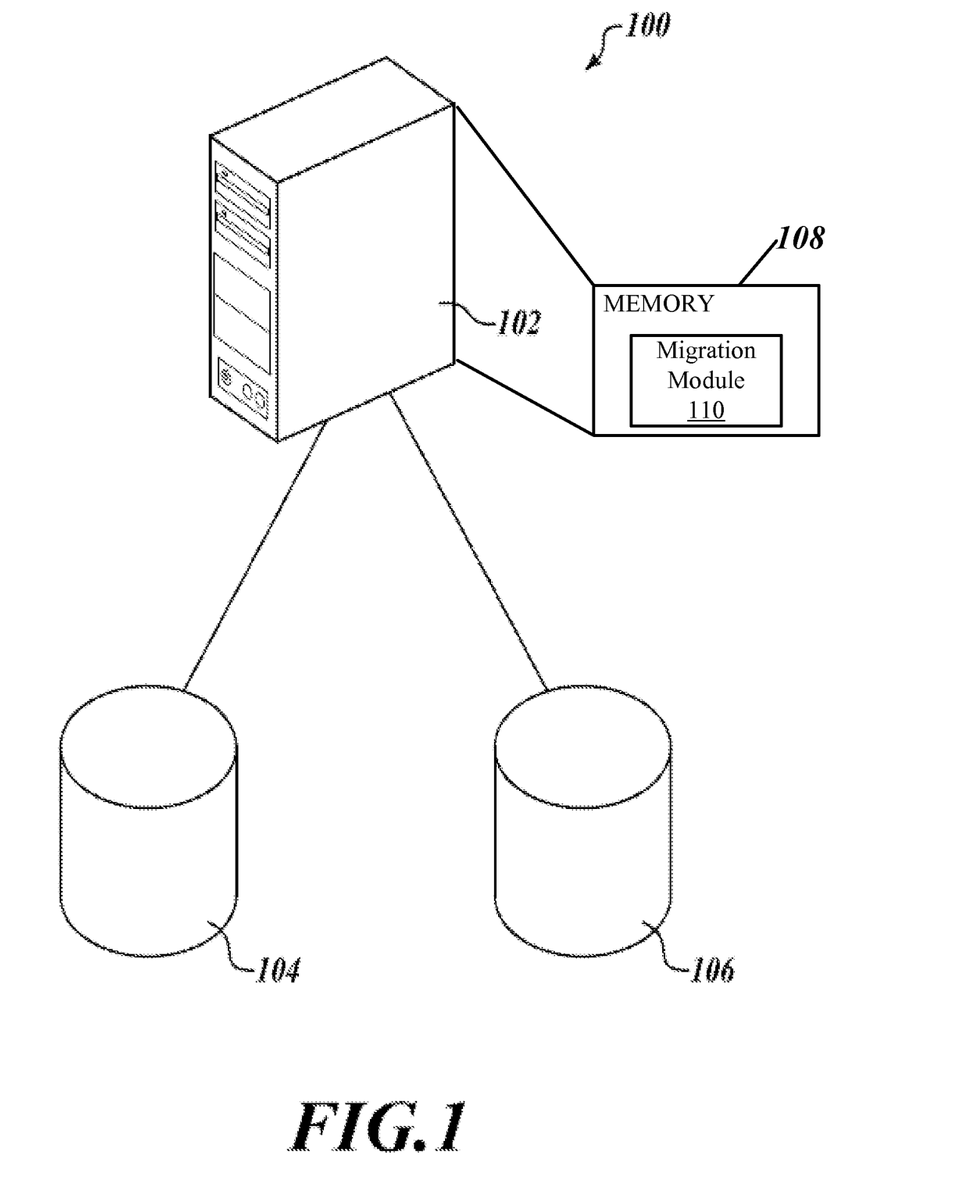
FIG. 1 shows an environment for providing effective migration between email systems.

FIG. 1 illustrates an example of a system 100 for performing migration of user accounts from a first email, identity or file platform (e.g., an email application) to a second corresponding email, identity or file platform. System 100 may include information handling system 102 that is in data communication with first data storage device 104 and second data storage device 106. First data storage device 104 may include user accounts associated with the first email, identity or file platform. Second data storage device 106 may include user accounts after information handling system 102 migrates the user accounts associated with the first email, identity or file platform into user accounts for use with the second email, identity or file platform.

System 100 may include, in some embodiments, a single storage device for storing email, identity or file user accounts for both the first and second email, identity or file platforms. In some embodiments, more than two storage devices may be used. System 100 may store email, identity or file user accounts for both the first and second email, identity or file platforms in a distributed manner across one or more networks.

Information handling system 102 may automatically build collections of recommended objects, based on relationship information that can include first information stored within the source email, identity or file system (e.g., access controls or directory information) and second information attained from a survey(s). Information handling system 102 may perform this using a migration module 110 stored in local memory 108. The first information can include delegation information, proxy access information, group membership information, organizational chart relationship information, frequent sender to recipient information, mentor information, etc. The second information can include answers to relationship questions. These questions can be answered by users associated with accounts to be migrated and/or supervisors/managers within the organization. Because information handling system 102 produces smarter collections of objects for migration taking into consideration the relationship information, the effort required to manage the migration process and, more importantly, interruptions to the daily operations of the organization may be greatly reduced.

In some embodiments, delegation information or an access control list (ACL) includes information related to the granting to others of the right to read, edit, delete, or send on one's behalf some or all content in a user's mailbox. The content in the user's mailbox may include mail, contacts, tasks, and/or calendar events. The following are example email systems that may include delegation information and other relationship information that system 100 uses for migration collection building: Google® Apps, Outlook®/Exchange®, Notes®/Domino®, GroupWise®, Zimbra®. A delegator-delegate (delegation) relationship may indicate important business relationships and a certain closeness of workers in a company, thus producing more cohesive migration collections. Relationship information are a likely indicator of important business proximity. Group membership information identifies a group of individuals where their email addressed are grouped together to form a single source for sending emails. The individuals are grouped because they share a common interest or business goal. Frequent sender/recipient information identifies those within the business that communicate frequently with each other, thus indicating an important business proximity. Mentor information includes information as to what employees play a mentorship role to other employees.

The second information can include answers to a survey intended to determine working relationships between employees. In one example, the survey can ask employees who they work with on a regular basis. Additionally, the employees can be asked to rank or prioritize their coworkers, based on importance to getting their work done, and/or what distribution groups should migrate with them.

Because system 100 forms collections using those important business relationships, then more effective and efficient migrations are possible. The information handling system 102 may follow a chain of delegations in order to yield a relevant collection of dozens or hundreds of users who ought to be migrated together. Once information handling system 102 has created a collection, information handling system 102 may perform the migration of the collection to the new email platform.

Figure 2:
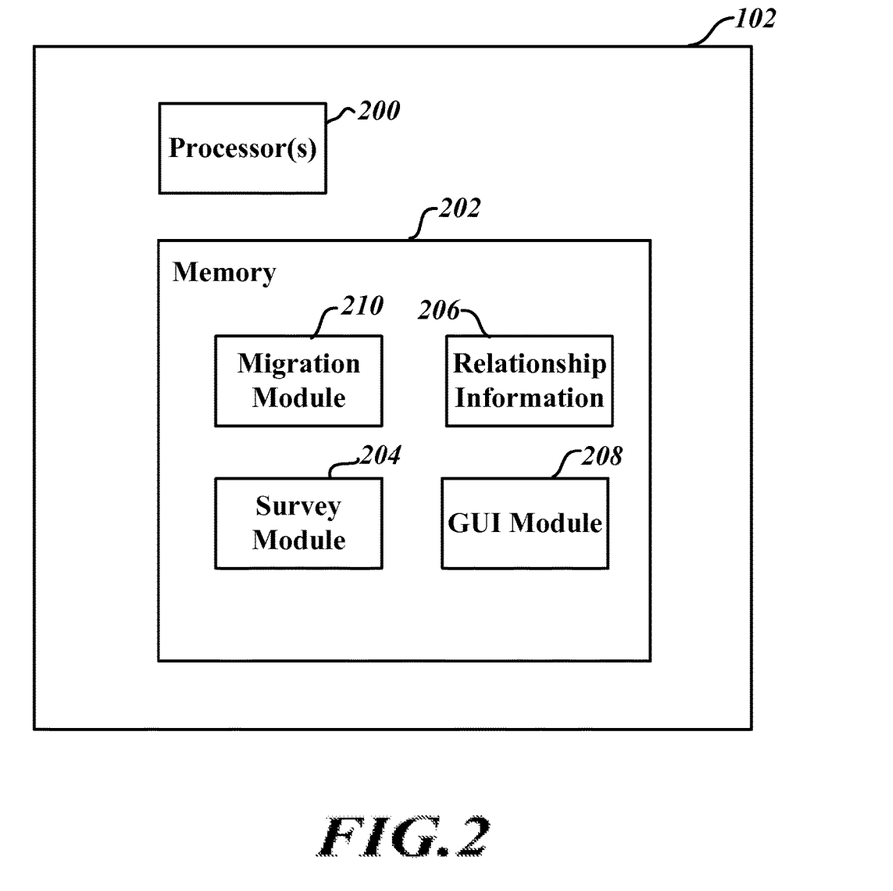
FIG. 2 shows an example of an information handling system for performing migration between email, identity or file systems.

As shown in FIG. 2, information handling system 102 may include processor(s) 200 and memory 202. Memory 202 may include survey module 204, relationship information 206, graphical user interface (GUI) module 208 and migration module 210. Survey module 204, when executed by processor(s) 200, can distribute a survey(s) to employees and/or managers/supervisory staff of the organization. Relationship information 206 can include first relationship information (e.g., organization chart and/or group membership information) and second relationship information (e.g., survey responses). Migration module 210 can aggregate first relationship information and second relationship information to create a relationship chart for presentation by GUI module 208. Migration module 210 can migrate collections of employee accounts from the first email platform to the second email platform based on the relationship chart and predefined or administrator-defined thresholds (e.g., collection size threshold or edge value threshold).

Processor(s) 200 may include a microprocessor, controller, a programmable logic device such as a field-programmable gate array (FPGA), an application-specific integrated circuit (ASIC), or other hardware resource operable to provide the ability to search through AD information of users' email accounts to assess what accounts to include in a migration collection.

Memory 202 may be any form of volatile or nonvolatile memory including magnetic media, optical media, RAM including dynamic RAM (DRAM) and static RAM (SRAM), ROM, erasable/programmable memory, solid-state memory, such as flash memory, removable media, or any other suitable local or remote memory component or components. Memory 202 may store any suitable data or information utilized by the processor(s) 200, including one or more software modules embedded in a computer-readable medium, and/or encoded logic incorporated in hardware. In particular embodiments, memory 202 may include main memory for storing instructions for processor(s) 200 to execute or data for processor(s) 200 to operate on. In particular embodiments, one or more memory-management units (MMUs) may reside between processor(s) 200 and memory 202 and facilitate access to memory 202 requested by processor(s) 200. As used herein, memory does not include purely transitory media, such as signals and communication media. As such, memory is a form of nontransitory computer-readable media. As used herein, nontransitory computer-readable media include one or more of optical storage, magnetic storage, RAM, ROM, solid-state memory such as flash memory, a hard disk drive, a floppy drive, tape storage, a smart card, an integrated circuit, and so forth.

Software modules include one or more of applications, bytecode, computer programs, executable files, computer-executable instructions, program modules, code expressed as source code in a high-level programming language such as C, C#, C++, Perl, Java, or other, a low-level programming code such as machine code, etc. An example of a software module is a BIOS file. A software module may include an application programming interface (API), a dynamic-link library (DLL) file, an .exe file, firmware, and so forth.

Processor(s) 200 may include more than one processor, such as may be distributed across private and/or public data network(s). Also, any of the modules 204, 208, or 210 may include components stored at memory distributed across the private and/or public data network(s). The different email platforms may be stored on the same storage device or may be stored on multiple data storage devices across the private and/or public data network(s).

Processes described herein may be illustrated as a collection of blocks in a logical flow graph, which represent a sequence of operations that may be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Figure 3:
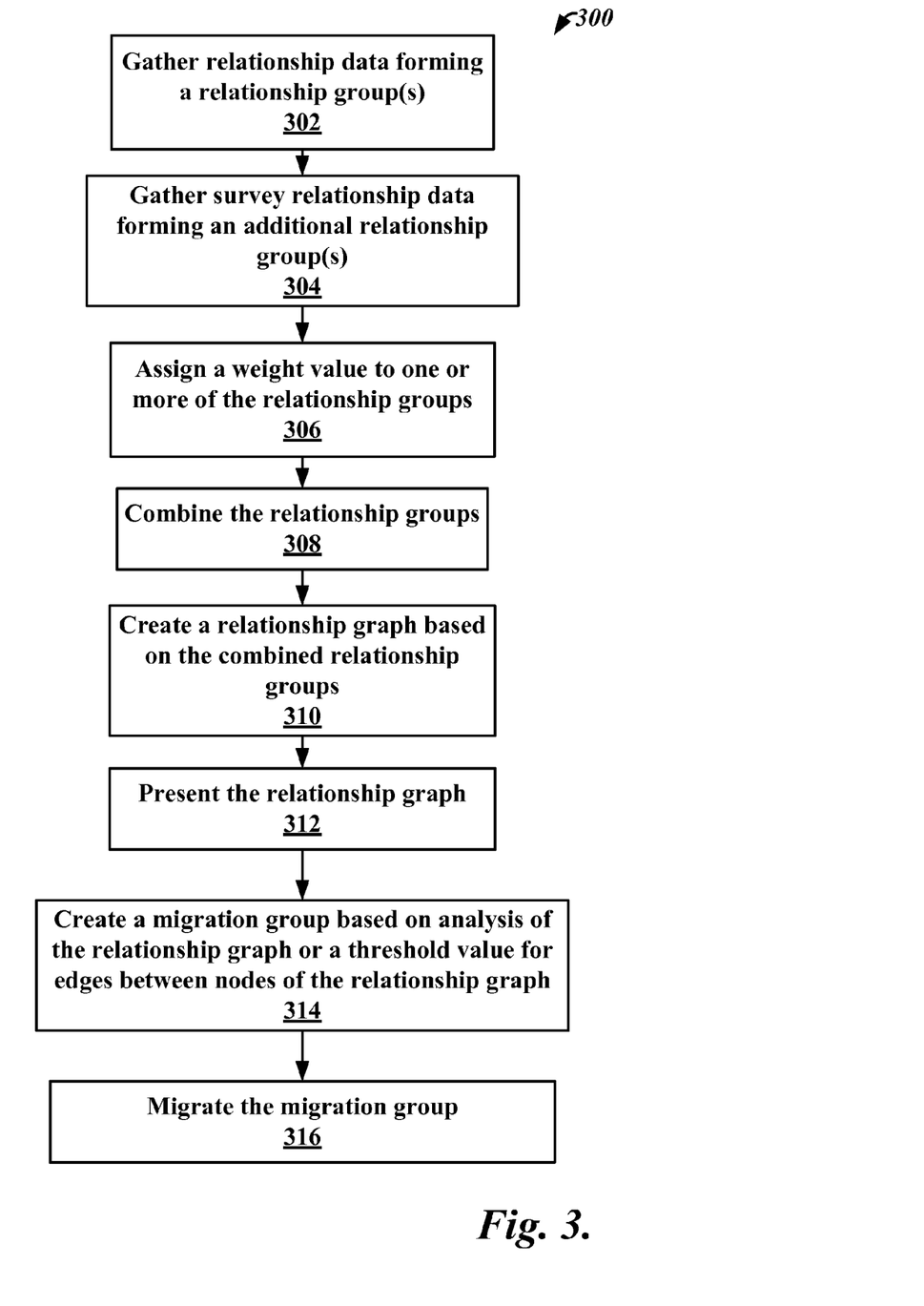
FIG. 3 shows an illustrative process for effectively migrating an email, identity or file system to a new corresponding system.

FIG. 3 shows an illustrative process 300 for effectively migrating an email system or comparable system to a new system. Illustrative process 300 may be performed by information handling system 102 shown in FIG. 1. Steps 302 through 314 work to create a relationship graph and partition into a group to be migrated in step 316. There are other methods to partition the accounts. Prior to processing the relationship information, any cycles, or circular relationships, may be removed from the relationship information to create a cycle-free relationship tree. First, at step 302, migration module 210 causes processor(s) 200 to gather relationship information from various sources (e.g., email distribution groups, organizational sources (e.g., email groups, org charts, etc.)). The gathered relationship information can be formed into one or more relationship groups.

At step 304, survey module 204 can form an additional group(s) based on results included in a migration survey(s). A first example group can be formed based on a response to a first survey question and a second example group can be formed based on a response to a second survey question. The responses to a survey are intended to determine working relationships between employees. In one example, the survey can ask employees who they work with on a regular basis. In another example, the employees can be asked to rank or prioritize their coworkers, based on importance to getting their work done, and/or what distribution groups should migrate with them. Location information can also be identified in a survey. To start the process, the migration administrator can configure the migration survey. This assumes the pool of all potential users who will migrate has been discovered by the migration solution. In one mode, the survey is sent out to users who will be migrated as individuals. In another mode, it could be sent only or additionally to managers/supervisory staff.

After the users have been surveyed, the relationships expressed in the survey responses in terms of one-to-one relationships and group membership can be used to create a relationship graph based on weighted links (also referred to as edges), see step 306. Weighted links/edges identified in the survey data indicates how important other employees relate to the survey respondent. These are considered individual weight values. Optionally, other relationship data can be included into the weighting of the relationship links, for example a migration administrator may apply weight values to mentorship relationships derived from a HR database, mail sending frequency relationships derived from Dell MessageStats/UCCS, or other organization data, even including delegation and org chart relationships.

A migration administrator can prioritize importance of distribution groups. This is considered group weight values. This allows the migration administrator to eliminate or create migration collection of a very large distribution group. Optionally, the migration administrator can apply additional weighting to particular groups based on various factors in order to give preference to smaller, or, perhaps less often, larger groups. This is considered distribution group weight values.

Also, the migration administrator can apply different weight values to locations. This is considered location weight values. Thus, those groups or individuals that are associated with a weighted location can receive the applied weighted location values. This would express a relationship between the employees who work at that location as a basis of the created "smart collection". This is considered location weight values.

Other grouping relationships and weighting of those other grouping relationships can be used for analyzing relationships of employees of a company when trying to determine how to effectively perform account migrations.

At step 308, migration module 210 can combine the relationship groups to form a single group of employee accounts taking into consideration any weight values. In one example, migration module 210 aggregates the weight values of each edge between similar accounts. This is shown by the examples shown in FIGS. 4-8.

Figure 9:
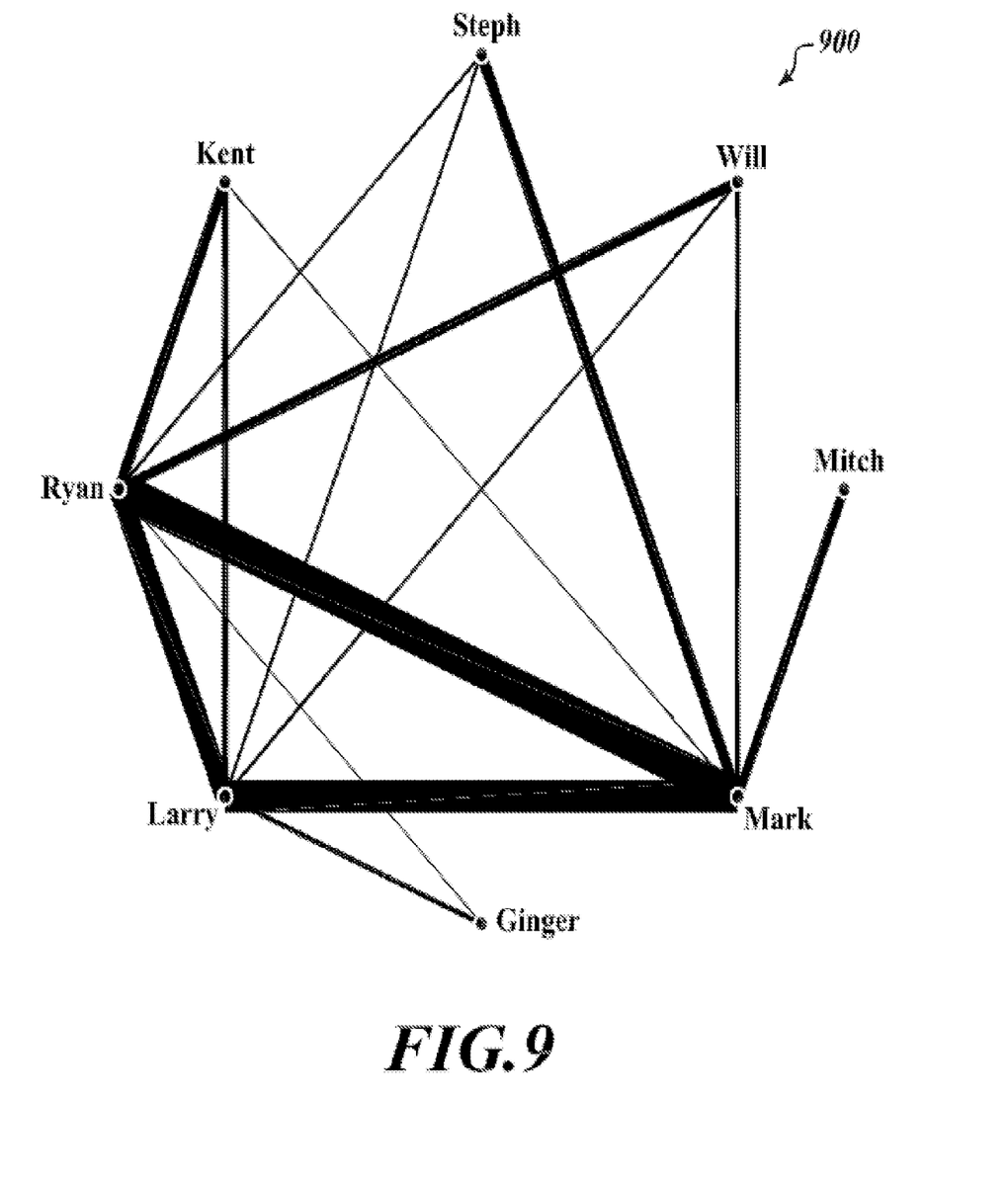
FIG. 9 shows an example of a line-weighted graph associated with the values shown in FIG. 8.

At step 310, migration module 210 can create a relationship graph using the aggregated edge values. At step 312, GUI module 208 presents the relationship graph to the migration administrator. The relationship graph can be in any format. FIGS. 4-8 illustrate a first format. FIG. 9 illustrates a second format. In response to viewing the relationship graph, the migration administrator can manipulate the weight values and repeat the process above before finally approving the resulting relationship graph.

At step 314, migration module 210 can create a migration group based on the finally approved relationship graph. Migration module 210 can create the migration group by analyzing the relationship graph according to threshold values. The threshold values may be predefined and/or defined by the migration administrator. For example, the threshold values may include the size of a migration group. Also, the threshold values may include an edge threshold value. Thus, only those employees who have edge values greater than the edge threshold value would be included in the migration group. Other group limiting values are described below.

At step 316, the migration of the first migration collection may be performed or, alternatively, the operator may be given an opportunity to review and/or update the collection prior to migration. Completion of the first migration collection may initiate repetition of process 300 in order to create a second migration collection.

To build the relationship graph, the data collected from the users are plugged into the relationship graph, setting a weight, or cost, to each to each link.

Figure 4:
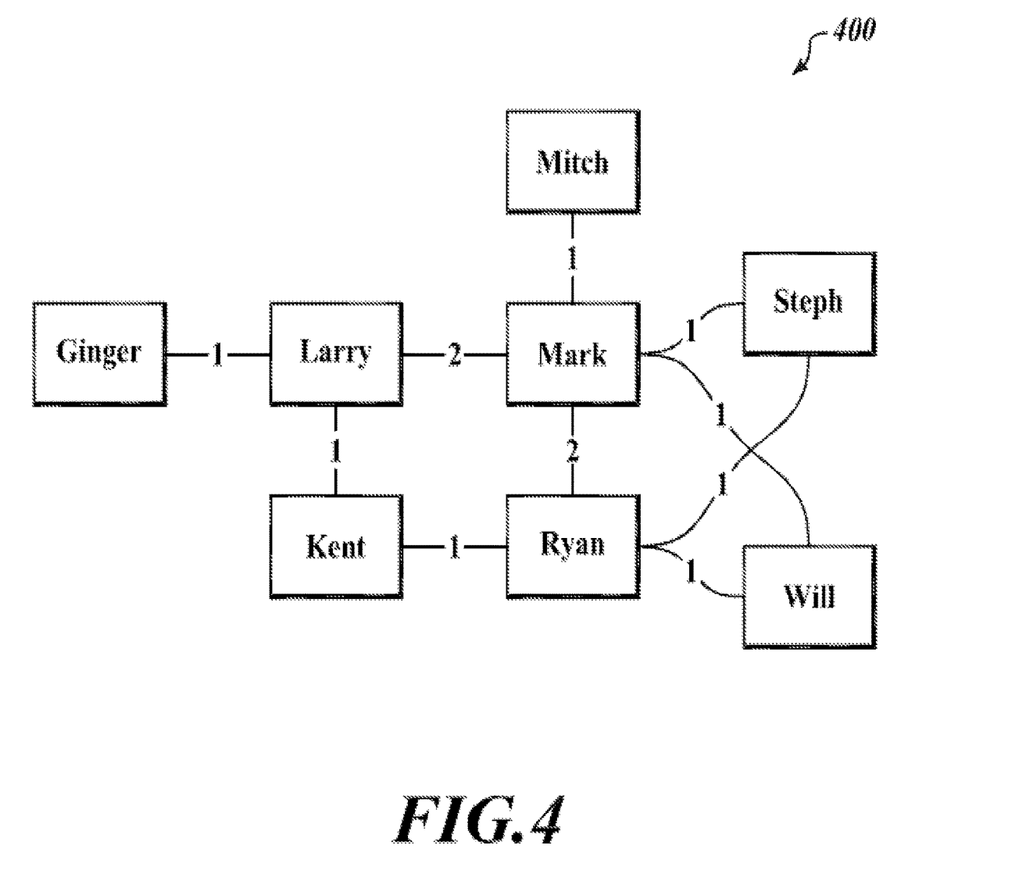
FIG. 4 shows an example of a determined relationship graph used for identifying entities to migrate with no weighting.

For example, in the simple un-weighted case user survey feedback from Larry, Ryan and Mark indicates the following links between employees:

Larry:
   Ryan
   Mark
   Kent
   Ginger
Ryan:
   Mark
   Will
   Kent
   Steph
Mark:
   Will
   Steph
   Larry
   Ryan
   Mitch FIG. 4 shows a relationship graph 400 for the above survey feedback. The relationship graph 400 includes some edges weighted more heavily than other edges. For example, the weights between Mark and Larry and between Mark and Ryan are highest because they selected each other. The smart collection created from this graph can place them together.

By starting at some seed user (vertex), a list of users can be built in the relationship network by traversing recursively down each relationship, preferring higher weights or weights above a threshold. The resulting list defines a "smart collection". The size of the collection can be controlled by limiting the number of levels traversed or by capping the size of the collection to a specific number of users.

Figure 5:
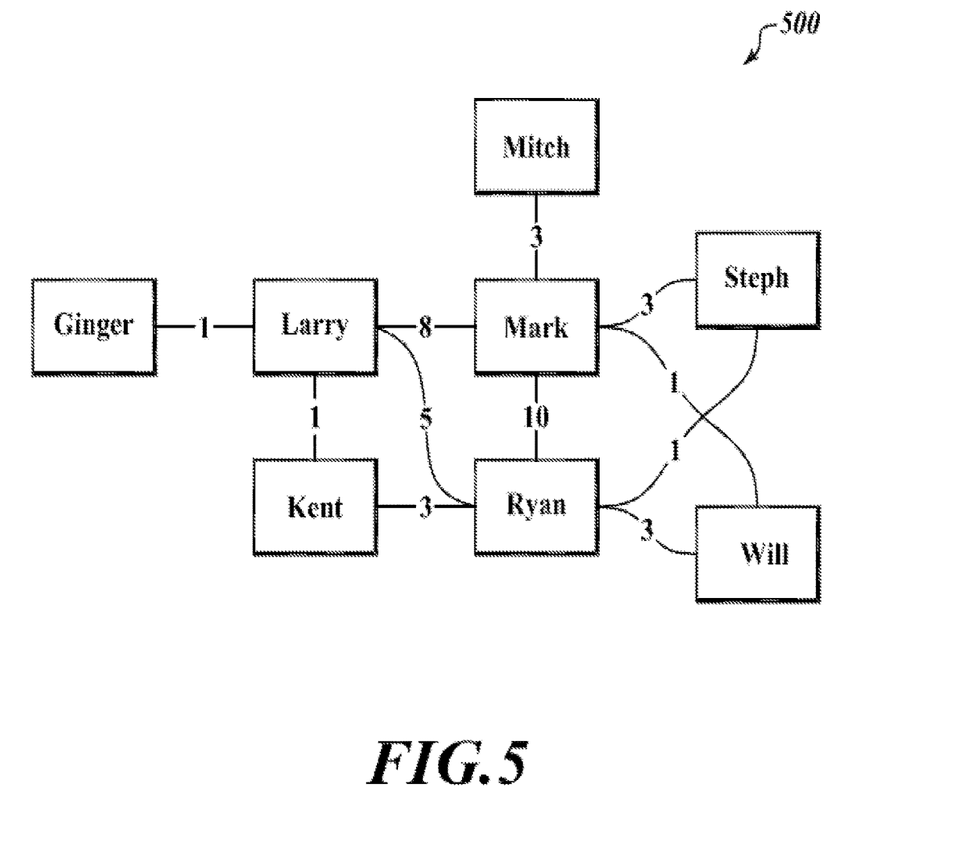
FIG. 5 shows an example of a determined relationship graph used for identifying entities to migrate with a first level of weighting.

As shown in FIG. 5, the users ranked their coworkers into one of the following tiers: 5 points; 3 points; or 1 point. The following are example survey results using the ranking technique:

Larry:
   Ryan—5
   Mark—3
   Kent—1
   Ginger—1
Ryan:
   Mark—5
   Will—3
   Kent—3
   Steph—1
Mark:
   Will—1
   Steph—3
   Larry—5
   Ryan—5
   Mitch—3

FIG. 5 shows a relationship graph 500 where it appears that Mark, Ryan and Larry are very likely to be included in the same migration group, while Ginger might not be assigned to this migration group.

Survey results may also indicate that Larry, Mark and Ryan also indicated that there are some distribution groups that they think they should migrate with. Below are example survey results of distribution group identification.

Larry:
   Green Team (Joe, Missy, Martha, Will, Kent, Steph, Mark, Larry, Ryan)
   Team Ginger (Ginger, Larry, Ryan. Peter, Kirk)
   Green Tech (Will, Kent, Steph, Mark)
Ryan:
   Team Ginger (Ginger, Larry, Ryan. Peter, Kirk)
Mark
   Green Tech (Will, Kent, Steph, Mark)

Figure 6:
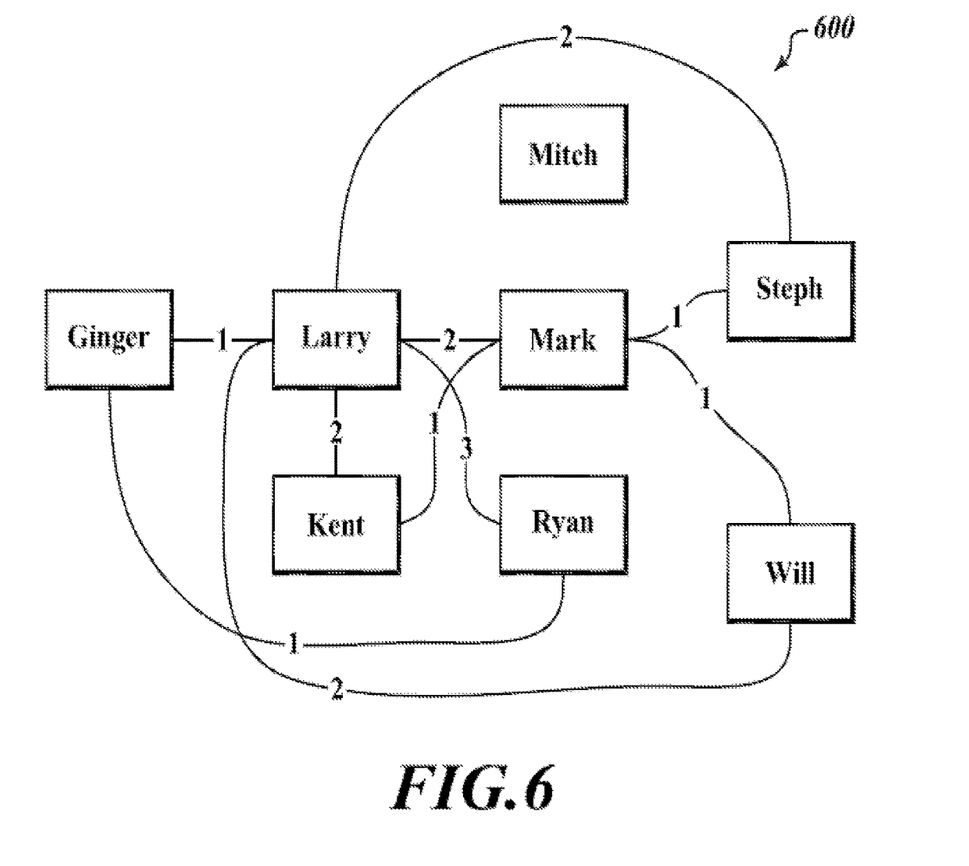
FIG. 6 shows an example of a determined relationship graph used for identifying entities to migrate with a second level of weighting.

FIG. 6 shows a relationship graph 600 from only the above identified distribution group survey data, and only includes the migrating users shown in FIG. 5. Membership in a distribution group is given a weight of 1. In this example Mitch is entirely excluded from the relationship graph 600.

Figure 7:
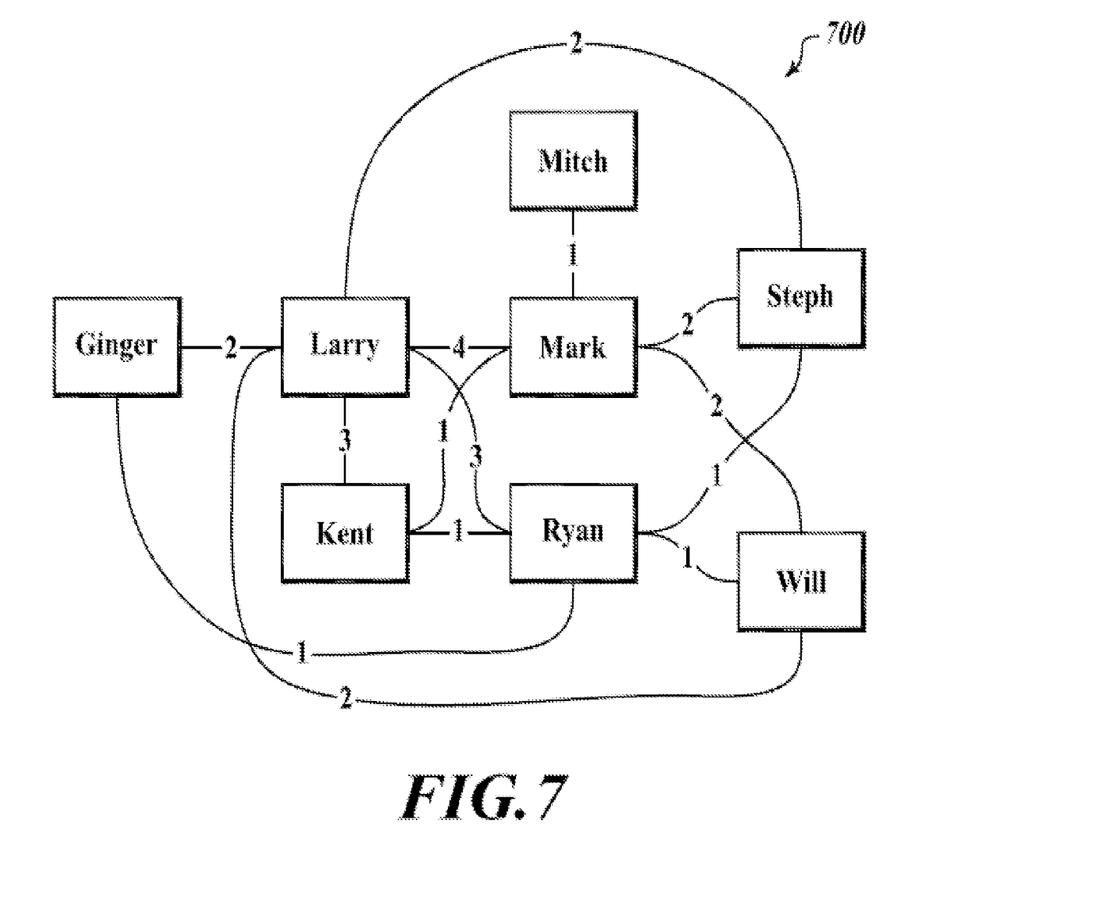
FIG. 7 shows an example of a determined relationship graph used for identifying entities to migrate with a third level of weighting.
Figure 8:
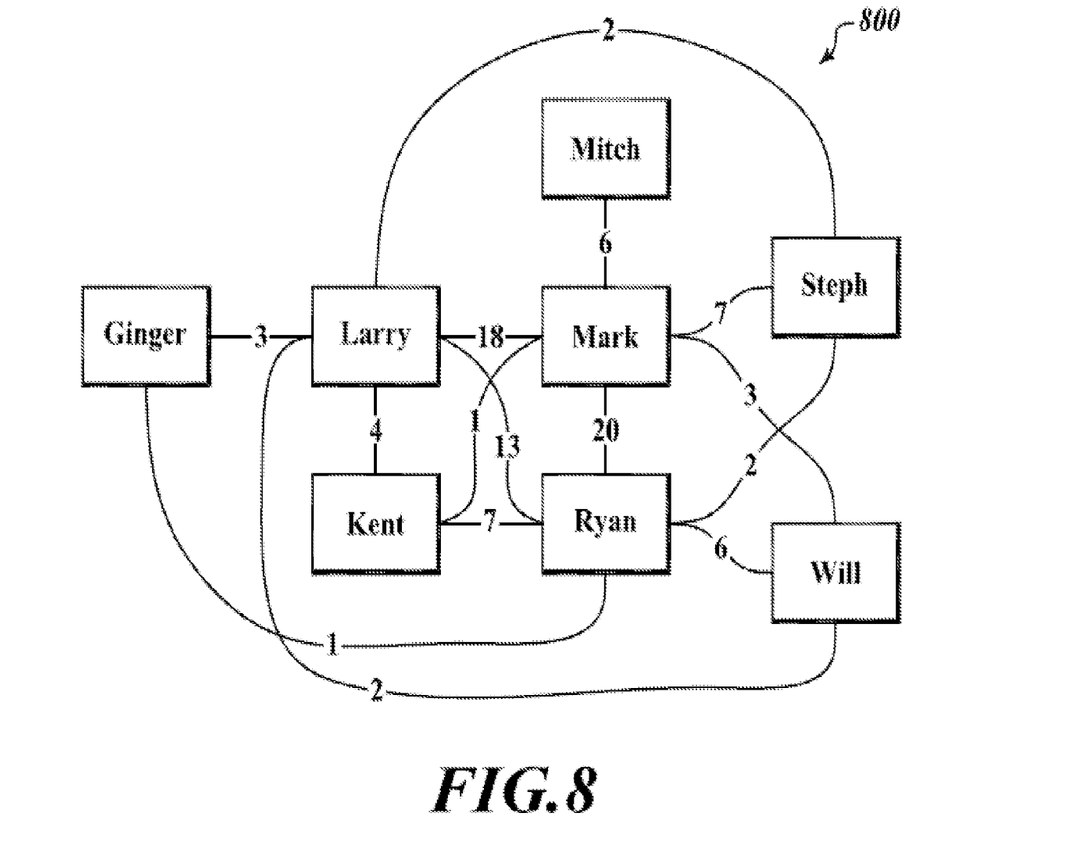
FIG. 8 shows an example of a determined relationship graph used for identifying entities to migrate with a fourth level of weighting.

As shown in FIG. 7, distribution group survey data from FIG. 6 is combined with the survey feedback results used to create FIG. 4. The results are shown in relationship graph 700. The values of the edges between like users are added to create the combined relationship graph 700.

In another example the distribution group survey data can be weighted differently from the user-identified relationship data. If the user-identified relationship data used to create relationship graph 500 is weighted twice as much as the distribution group survey data used to create relationship graph 600, then the edge weight results are aggregated as shown in relationship graph 800 shown in FIG. 8.

Relationship graph 800 makes Ginger seem peripheral. FIG. 9 is an alternative visualization of relationship graph 800 of FIG. 8. Relationship graph 900 of FIG. 9 makes it easier to see that Mitch and Will are also less connected to this group.

Additional graphs can include important locations ranked by user or other data provided by users to the survey, weighted as directed by the migration administrator or migration consultant. Additional relationships like org chart information could be included in the weighted calculation of the edge cost (link weight).

$$C_E = \Sigma w_i * C_i$$

$C_E$—Edge Cost
$w_i$—weighting factor of relationship type i
$C_i$—value of relationship of type I between the two nodes One or more of a variety of techniques will be used to determine the subgroups or clusters within the network graph, possibly including but not limited "n-clan/n-clique" or "k-plex/k-core" analysis, as used in social network analysis.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the scope of the present disclosure.

What is claimed is:

1. A method comprising:
   creating, by an information handling system and based on relationship information, a collection of related accounts or objects stored in accordance with at least one domain, wherein the relationship information comprises at least survey data, wherein the survey data comprises user-identified relationships to one or more other users, wherein the relationship information is organized into at least one of a first category and a second category, the first category based at least on the survey data and the second category based at least on organizational data, and wherein creating collections comprises:
   identifying one or more weight values for the first category or the second category;
   identifying one or more weight values for at least one of the user-identified relationships; and
   combining the first category and the second category based at least on the one or more weight values for the first category or the second category and the one or more weight values for at least one of the user-identified relationships to create combined weight values; and
   migrating, by the information handling system, data for users in the collection of related accounts or objects into the at least one domain.

2. The method of claim 1, wherein the relationship information further comprises location information.

3. The method of claim 1, wherein the relationship information further comprises organizational information.

4. The method of claim 1, wherein the relationship information further comprises at least one of sender/recipient, site membership or distribution list membership.

5. The method of claim 1, wherein the survey data identifies users' relationships to one or more other users.

6. The method of claim 1, wherein the survey data of one of the users identifies the user's relationship to one or more distribution groups.

7. The method of claim 1, wherein the survey data obtained from one of the users identifies the user's relationship to one or more distribution groups and to one or more other users.

8. The method of claim 1, wherein the creating the collection comprises:
   selecting a collection based on one or more threshold values and the combined weight values.

9. An information handling system comprising:
   a processing device; and
   memory configured to store accounts or objects and relationship information associated with the accounts or the objects in accordance with at least one domain, wherein the relationship information comprises at least survey data, wherein the survey data comprises user-identified relationships to one or more other users, wherein the relationship information is organized into at least one of a first category and a second category, the first category based at least on the survey data and the second category based at least on organizational data, the memory further storing one or more program modules executable by the processing device to:
      identify, based on the relationship information, a collection of related accounts or objects stored in accordance with the at least one domain by
         identifying one or more weight values for the first category or the second category;
         identifying one or more weight values for at least one of the user-identified relationships; and
         combining the first category and the second category based at least on the one or more weight values for the first category or the second category and the one or more weight values for at least one of the user-identified relationships to create combined weight values; and
      migrate information included in the collection of related accounts or objects into the at least one domain.

10. The information handling system of claim 9, wherein the relationship information further comprises location information and organizational information.

11. The information handling system of claim 9, wherein the survey data associated with one of the users identifies the user's relationship to one or more distribution groups and to one or more other users.

12. The information handling system of claim 9, wherein the one or more program modules are further executable by the processing device to identify the collection by:
   selecting a collection based on one or more threshold values and the combined weight values.

13. A method comprising:
   at a memory device, storing a plurality of user accounts in accordance with at least one domain and relationship information, wherein the relationship information comprises at least survey data, wherein the survey data comprises user-identified relationships to one or more other users, wherein the relationship information is organized into at least one of a first category and a second category, the first category based at least on the survey data and the second category based at least on organizational data; and
   at an information handling system,
      identifying, based on the relationship information, a collection of related accounts or objects stored in accordance with the at least one domain;
      identifying one or more weight values for the first category or the second category;
      identifying one or more weight values for at least one of the user-dentified relationships; and
      combining the first category and the second category based at least on the one or more weight values for the first category or the second category and the one or more weight values; and
      migrating information included in the collection of related accounts or objects into the at least one domain.

14. The method of claim 13, wherein the relationship information further comprises at least one of location information or organizational information.

15. The method of claim 13, wherein the survey data associated with one of the users identifies the user's relationship to one or more distribution groups and to one or more other users.

16. The method of claim 13, wherein the identifying a collection further comprises:
   selecting a collection based on one or more threshold values and the combined weight values.

17. The method of claim 16, wherein the one or more threshold values comprises one of a collection size threshold or a relationship weight value threshold.

* * * * *